Feb. 3, 1970  S. J. HOFF  3,493,088
LATCH AND CAM RELEASED COIL CLUTCH
Filed Feb. 23, 1968  2 Sheets-Sheet 1

INVENTOR
STEPHEN J. HOFF
BY
Trask, Jenkins & Hanley
ATTORNEYS

Feb. 3, 1970  S. J. HOFF  3,493,088
LATCH AND CAM RELEASED COIL CLUTCH
Filed Feb. 23, 1968  2 Sheets-Sheet 2
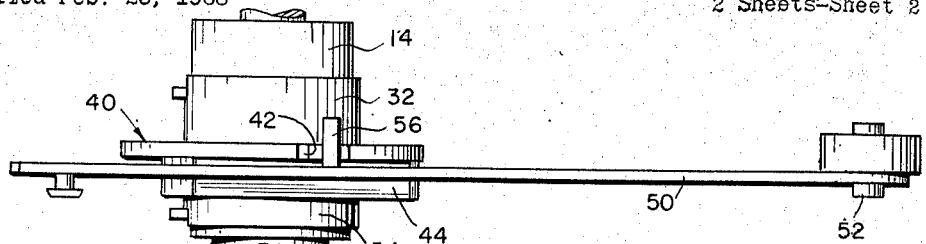
Fig. 5
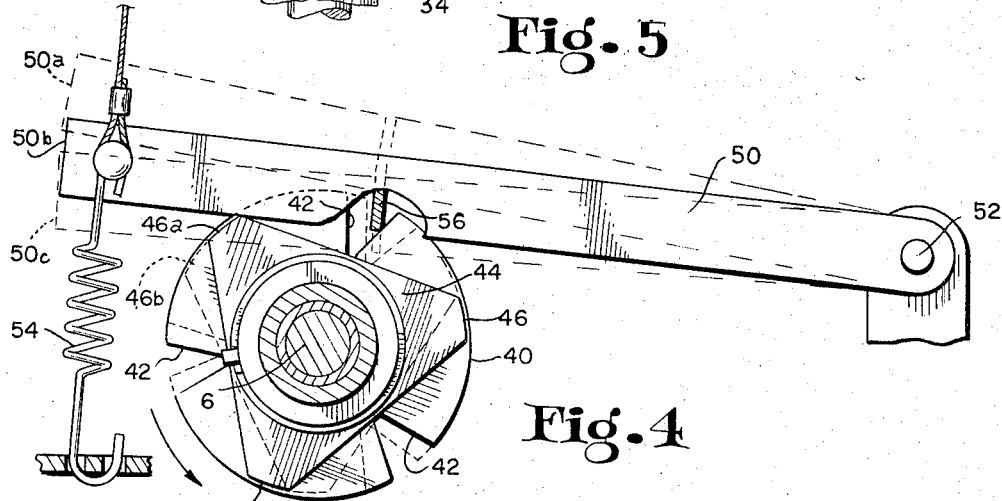
Fig. 4
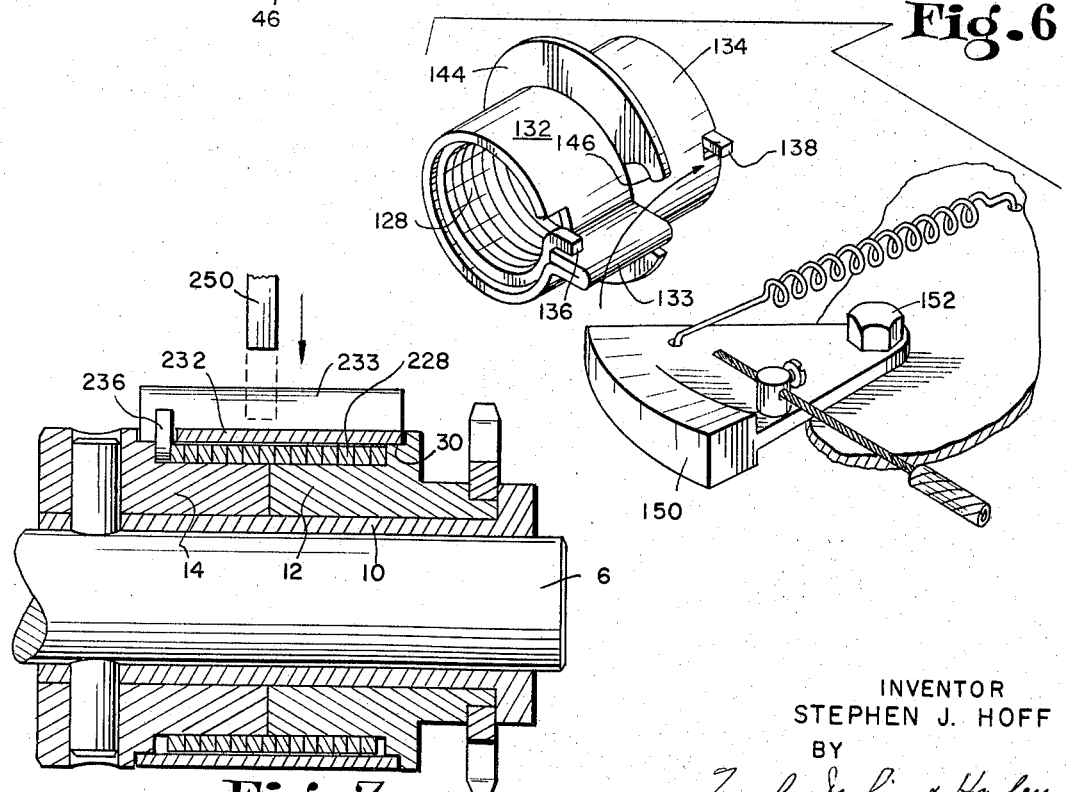
Fig. 6
Fig. 7
INVENTOR
STEPHEN J. HOFF
BY
Trask, Jenkins & Hanley
ATTORNEYS

# United States Patent Office 3,493,088
Patented Feb. 3, 1970

3,493,088
LATCH AND CAM RELEASED COIL CLUTCH
Stephen J. Hoff, Richmond, Ind., assignor to Hoffco, Inc., Richmond, Ind., a corporation of Indiana
Filed Feb. 23, 1968, 707,848
Int. Cl. F16d *11/08;* A01d *35/12*
U.S. Cl. 192—26                                6 Claims

ABSTRACT OF THE DISCLOSURE

A releasable coil-spring clutch which releases the driven shaft for free rotation in both directions. Driving and driven clutch elements are mounted on a common bearing sleeve adapted to be mounted on a drive shaft, with the sleeve and driving member pinned to the shaft. The driven member carries an output sprocket and is rotatable on the sleeve. A helical clutch spring closely engages adjoining cylindrical surfaces on the clutch elements to wind on them and clutch the elements together in one direction of rotation. A primary stop collar mounted about the spring engages an out-turned tang at the leading end of the spring. When this is stopped, the spring unwinds from and releases the driving member. A secondary stop collar engaging a tang at the trailing end of the spring is then cammed forward relative to the primary stop collar, which unwinds the spring sufficiently to release it from the driven element. The spring is then held by the collars and their actuating means in sufficiently unwound condition to release the driven element for free rotation in both directions. Such a spring clutch provides a simple and inexpensive clutch for a lawnmower wheel drive, and operates to fully release the driven wheels for both forward and rearward rotation, so that the mower can be moved backward manually. The clutch is controlled by a simple Bowden wire or the like.

The clutch unit is a compact self-contained assembly adapted to be sold, handled and installed as a unit.

BACKGROUND OF THE INVENTION

This invention relates to a coil-spring clutch especially adapted for use in controlling the wheel drive of a power lawnmower. Coaxial adjoining cylindrical surfaces on driving and driven clutch members are interconnected by a close-fitting helical coil spring wound of such hand that the spring tends to wind up and increase its grip on the surfaces under torque in a forward drive direction of relative rotation, and tends to release its grip on the surfaces when the spring is subjected to unwinding torque. The clutch is self-engaging in one torque direction and tends to be self-disengaging in the opposite torque direction.

The present invention has to do with disengaging the clutch, to interrupt the power train to the wheels of a lawnmower, and to do so in a manner which will free the driven elements and the wheels for rotation in both directions and thus to permit the mower to be freely moved, manually, both forward and backward.

The present invention is also concerned with providing a self-contained clutch assembly which is compact and inexpensive and which lends itself to convenient and effective use in lawnmower and like drive trains.

SUMMARY OF THE INVENTION

In accordance with the invention the leading end of the coil spring, in the forward direction of rotation in which it tends to wind-up and grip the clutch elements, is engaged with a collar which is normally free to rotate but which can be stopped by some manually controlled stop member. When such collar and the leading end of the spring is stopped, then rotation of the driving member contained within the spring at such leading end will tend to unwind the spring relative to the stop and will thereby cause the spring to release its grip on such driving member. This will interrupt power transmission from the driving member to the spring and the driven member, and in the case of a mower will interrupt power transmission from the engine to the wheels.

Under these conditions, and indeed under any conditions, the wheels and the driven clutch member will be free to rotate forward because the clutch has over-running characteristics. This over-running occurs because forward rotation of the driven clutch member is, with respect to the spring, in a direction tending to unwind the spring and hence to release its clutching grip on the driven member when such member is rotated in the spring-unwinding direction.

The above-described disengagement of the clutch will not, however, permit the driven member and the wheels of the mower to be rotated rearward, and the mower will not be free to be moved backward. This occurs because such rearward rotation tends to tighten the grip of the driven element with the spring and tends to rotate the spring in a rearward direction, and this in turn backs the stop collar away from the stop and thereby tends to re-engage the spring with the driving member. To fully disengage the clutch and permit free rearward movement of the driven parts, I engage the trailing end of the spring with a second collar, and after the first collar has been stopped as described above, I rotate the second collar relative to the first collar in a direction, and sufficiently, to unwind the spring and release it both from the driving member and from the driven member. Both such clutch members can then rotate freely and the driven parts are made free for rotation in both directions.

The camming action which produces relative rotation of the two collars may be produced in a number of ways. Preferably, I provide a stop shoulder on the first collar and an inter-related cam face on the second collar and provide an actuating element which first engages the stop shoulder to stop the first collar, and through it to stop the spring and the second collar. The actuating element is then moved further to produce the camming action. In a modification the cam is formed as part of the actuating element and acts on fixed shoulders on the collars.

To provide a self-contained clutch assembly, I mount two cylindrical clutch elements on a mounting sleeve and make the driven member rotatable on such sleeve between a fixed flange at one end and the driving member fixed to the sleeve at the other end; I mount the spring on cylindrical surfaces between shoulders on the clutch members, and I mount the two collars around the spring and support them at their ends in rabbet grooves on such members. The driven member may carry a power transmission element such as a sprocket or pulley, and the assembly may be mounted as a unit on a driving shaft.

Preferably, all parts of the assembly except the spring are made symmetrical in such a way that they will operate in either direction of rotation, and will cooperate with springs of either hand to provide drive in corresponding directions of rotation.

BRIEF DESCRIPTION OF THE DRAWINGS

The accompanying drawings illustrate the invention. In such drawings:

FIG. 4 is an end elevation of the release collars shown in FIG. 2, with a clutch release lever shown in full-line in partial-release position and in dotted lines in full-engagement and full-release positions;

FIG. 5 is a plan view of the release mechanism of FIG. 4;

FIG. 6 is a perspective view of a modification of the clutch of FIG. 1, showing a different clutch release mechanism; and FIG. 7 is a sectional view of a modified spring clutch assembly embodying certain features of my invention.

DETAILED DESCRIPTION, FIG. 1

Figure 1:
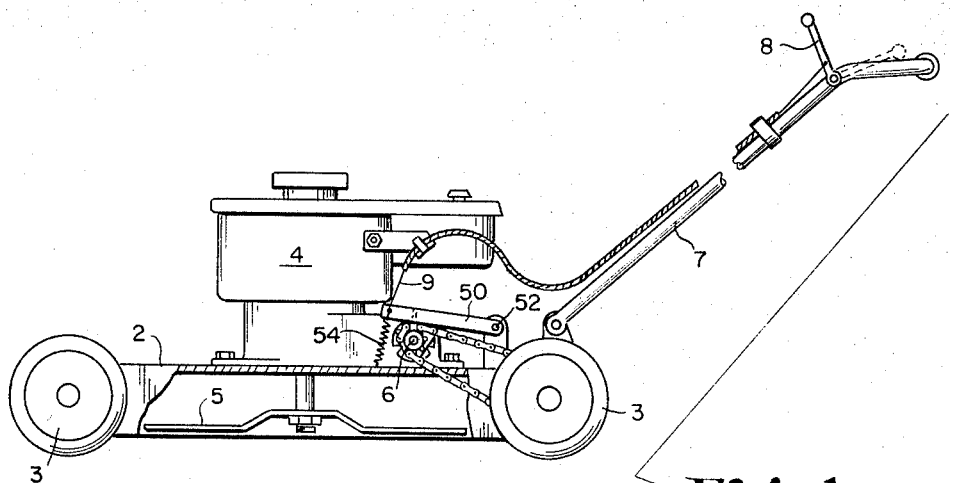
FIG. 1 is a diagrammatic view of a power lawn mower embodying the present invention in its wheel-drive train.
Figure 2:
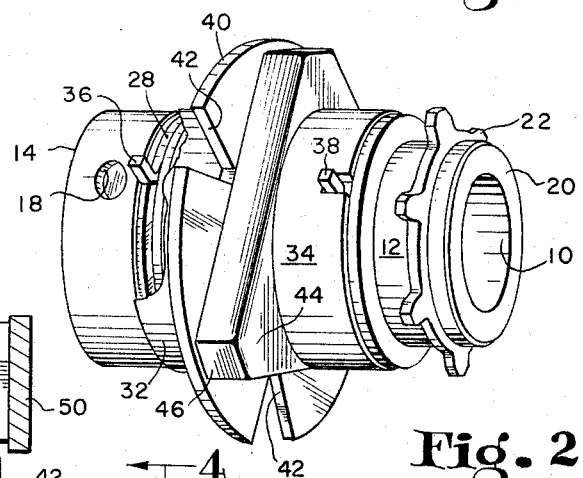
FIG. 2 is a perspective view of a spring clutch assembly embodying my invention in a preferred form.
Figure 3:
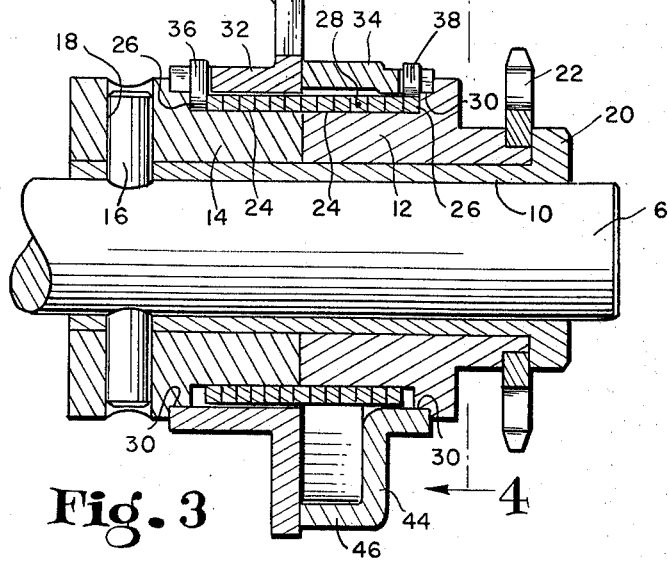
FIG. 3 is an axial sectional view of the clutch of FIG. 1.

The lawn mower shown in FIG. 1 comprises a body housing 2, mounted on wheels 3 and having an engine 4 driving a cutter blade 5 and a power take-off shaft 6 on which my clutch is mounted to drive a chain which drives the rear wheels 3. The handle 7 of the mower is provided with a clutch control lever 8 which pulls a clutch-release cable 9.

DETAILED DESCRIPTION OF THE CLUTCH OF FIGS. 1–5

The clutch shown in FIGS. 2–5 comprises a central mounting sleeve 10 on which are mounted a driven element 12 and a driving element 14. The driving element is fixed to the sleeve by a pin 16 received in a cross hole 18, and retains the driven element 12 rotatably on the sleeve between such driving element and a fixed peripheral flange 20 at the opposite end of the sleeve.

The assembly is adapted to be mounted on a drive shaft 6 and fixed thereon by the pin 16, so that the shaft is fixed to the driving element 14. The driven element carries an output member, here shown as a sprocket 22.

The two clutch elements 12 and 14 have adjoining cylindrical surfaces 24 defined at their outer ends by shoulders 26, and a clutching coil spring 28 is mounted in close-fitting engagement about such surfaces 24 between the shoulders 26, with the leading half of the spring 28 wound on the driving element 14 and the trailing half of the spring wound on the driven element 12. Rabbet grooves 30 are formed on the elements at the top of the shoulders 26, and primary and secondary stop collars 32 and 34 are mounted about the spring 28 with their ends rotatably received in the grooves 30. The leading end of the spring 28 has an upturned tang 36 received through a notch in the primary stop collar 32; and the trailing end of the spring has a similar tang 38 received through a notch in the secondary stop collar 34.

The primary stop collar 32 carries a wide radial flange 40 at its inner end, and this is provided with three circumferentially spaced notches 42 of V-shape.

The secondary stop collar 34 is shaped at its inner end to form a three-lobed cam 44, the lobes 46 of which are spaced between the notches 42 of the stop collar 32. The collars are normally held in this relation by the tangs 36 and 38 on the spring 28.

An actuator bar 50 is mounted on a pivot 52, and is normally urged toward the collars by a spring 54. The bar has a laterally projecting stop arm 56 positioned to move into any notch 42 and hence into the path of the shoulder defining the rear edge of the notch, to stop rotation of the stop collar 32. As shown in FIG. 4, the bar 50 has a fully raised position 50a in which the clutch is fully engaged, an intermediate position 50b (full lines) in which it stops the collar 32, and a fully lowered position 50c in which the clutch is fully released.

The relationship of parts is such that when the arm 56 first enters the notch 42 to stop the primary collar 32, the end of the bar 50 will then engage and lie at an acute angle to one of the lobes 46a of the cam 44. Further inward movement of the bar will then cam such lobe 46a and the secondary collar 34 forward in the direction of rotation of the assembly to the dotted line position 46b, which brings the bar 50 flat against the chordal face of the cam lobe. Simultaneously, the stop arm 56 cams the primary collar 32 rearward to the dotted line position shown in FIG. 4. This has the effect of forcing the spring-end tangs 36 and 38 apart in a direction and to an extent which unwinds the spring sufficiently to release it from the cylindrical surfaces 24 of both the driving member 14 and the driven member 12. The clutch is then completely disengaged and both elements are free to rotate in either direction with respect to each other and with respect to the spring, which is held stopped and unwound by the action of the actuator bar 50 on the collars 32 and 34. The spring 54 is strong enough to produce the camming action necessary to unwind the coil spring 28 for this purpose.

The clutch is engaged by withdrawing the actuator bar 50 to its position 50a (FIG. 4) which releases it from the collars which allows them to rotate to their normal positions (FIG. 2), and hence permits the spring to assume its normal tight relation about the surfaces 24 in which forward rotation of the driving element 14 causes the spring to wind tighter about such surfaces and firmly clutch the two elements together for drive in the forward direction.

In the lawnmower of FIG. 1, the control lever 8 is arranged to pull the clutch actuator arm 50 to clutch engaging position 50a (FIG. 4) and to hold the arm in this position. When the lever 8 is released, the spring 54 pulls the lever 50 against the clutch collars 40 and 44. The stop arm enters one of the notches 42 to stop the primary stop collar 32, and hence to stop the leading end of the spring and disengage the clutching action between the driving member 14 and the spring. The arm 50 also engages a lobe 46a of the secondary stop collar 34 and its further movement rotates such collar 46a to an advanced position 46b, and rotates the collar 40 rearward, and thereby unwinds the spring 28 and releases the clutching engagement between that spring and the driven element 12. The clutch is then fully disengaged and the driven element and the rear wheels are then free to rotate forward and rearward, and the mower can be freely moved forward and backward by the handle 7.

To reengage the clutch the lever 8 is pulled back to release position, which withdraws the actuator arm to its position 50a and permits the clutch spring 28 to assume its normal engagement with the surfaces 24 of the clutch elements.

MODIFICATION OF FIG. 6

The modified clutch of FIG. 6 comprises an assembly of sleeve 10, driving element 14 and driven element 12 the same as in FIGS. 2–5, which parts are omitted in FIG. 6 for clarity. The clutch spring 128 is of left-hand helix to drive in counterclockwise direction, as indicated by the arrows. Its leading end has a tang 136 engaged in a primary stop collar 132 and its trailing end has a tang 138 engaged in a secondary stop collar 134. The primary stop collar 132 has an axially extending radial rib 133, and the secondary stop collar 134 has a circumferential flange 144 which forms a shoulder 146 that normally stands in angularly spaced relation with the inner end of the rib 133. A wedge stop 150 is mounted on a pivot 152 for movement, first, into the path of the rib 133 to stop the primary stop collar 132, and second, between the rib 133 and the shoulder 146 to wedge or cam that shoulder forward with respect to the rib 133. This wedging or camming action acts through the collars and the tangs at the ends of the clutch spring 128, to unwind that spring to a fully released position.

MODIFICATION OF FIG. 7

The modified clutch of FIG. 7 does not fully release. It has an inner sleeve 10 and driving and driven members 14 and 12 the same as the other modifications. Its clutch spring 228 has a tang 236 at its leading end engaged in a stop collar 232 which carries a radial rib 233. Such collar extends the full length of the spring and is supported at its opposite ends in the rabbet grooves 30 of the driving and driven elements. The clutch is normally engaged, and is disengaged by projecting a stop member 250 into the path of the rib 233. This stops the rotation of the collar and hence stops the leading end of the spring 228. The driving member then tends to unwind the leading half of the spring relative to the stopped leading end and releases the clutching action between itself and the spring.

As in other modifications, the parts of this clutch form a compact self-contained assembly which is convenient to handle and install on a drive shaft as part of a drive train.

I claim:
1. A releasable coil-spring clutch, comprising
driving and driven elements having coaxial, adjoining cylindrical clutch surfaces,
a helical clutch spring disposed about said surfaces and normally engaging the same to clutch the driving and driven elements together for drive in the direction which tends to wind the spring onto the surfaces,
a primary stop collar having a primary stop shoulder thereon and engaged with the leading end of said spring, and a secondary stop collar having a secondary stop shoulder thereon and engaged with the trailing end of said spring,
an actuator member having a shoulder-engaging portion movable generally perpendicular to the path of the primary stop shoulder into such path to stop the primary collar and thereby cause disengagement between the driving element and spring,
said actuator member being thereafter movable relative to the primary stop shoulder into engagement with the secondary stop shoulder and through further movement while so engaged, said actuator member and shoulders including cam means operative during such further movement to force the shoulders angularly apart to thereby unwind the spring and disengage it from the driven member.

2. A releasable coil spring clutch as set forth in claim 1, in which said secondary stop shoulder is a cam lobe having a normal position relative to said primary stop shoulder in which the collars permit said spring to wind onto the clutch faces; and said actuator member in its said further movement actuates said cam lobe and thereby rotates the secondary stop collar relative to the primary stop collar.

3. A releasable coil spring clutch as set forth in claim 1 in which said secondary stop shoulder is angularly spaced from the primary stop shoulder in the direction of forward drive rotation, and said actuator member is a cam movable into the path of said primary stop shoulder to stop said primary stop collar and then between said shoulders to cam them apart and thereby unwind said spring.

4. The invention as set forth in claim 3 in which said actuator member comprises an arcuate wedge-shaped cam pivotally movable across the path of the primary stop shoulder and to carry its narrow portion between said shoulders, and further pivotally movable to force the broader portions of its wedge shape between said shoulders to thereby rotate said shoulders angularly away from each other.

5. The invention as set forth in claim 1 in which said primary stop collar carries a circumferential flange having a notch therein forming the primary stop shoulder, said secondary stop collar lies adjacent said flange and forms a cam surface normal to said flange and angularly spaced less than 90° from said notch, and said actuator member is a lever arm pivoted for movement against said cam surface and has a transverse projection overlying said flange for movement thereagainst and into said notch to engage said primary stop shoulder, said flange serving to block movement of said lever arm into engagement with said cam surface until said projection enters said notch, and said notch thereafter permitting further movement of said lever arm in camming relation against said cam surface to cause relative rotation between said collars.

6. A releasable coil spring clutch as set forth in claim 1 in which said primary stop collar carries a circumferential flange having a notch therein forming the primary stop shoulder, and the secondary stop collar lies adjacent said flange and forms a chordal surface normal to said flange, and said actuator member is mounted for movement against the chordal surface and has a lateral projection extending across said flange and positioned to enter said notch to stop said primary stop collar and thereafter move further into said notch as the actuator member moves against said chordal surface.

References Cited
UNITED STATES PATENTS

| | | | |
|---|---|---|---|
| Re. 25,229 | 8/1962 | Sacchini et al. | 192—26 XR |
| 2,829,748 | 4/1958 | Sacchini et al. | 192—26 |
| 2,865,159 | 12/1958 | Musgrave | 56—25.4 |
| 3,059,397 | 10/1962 | Anderson et al. | 56—25.4 |
| 3,062,345 | 11/1962 | Cruzen | 192—26 |
| 3,153,352 | 10/1962 | Sajovek. | |
| 3,335,835 | 8/1967 | Conlon | 192—81 |
| 3,340,975 | 12/1967 | Erickson | 192—81 |
| 3,373,851 | 3/1968 | Baer | 192—26 X |

BENJAMIN W. WYCHE III, Primary Examiner

U.S. Cl. X.R.

56—25.4; 192—81